United States Patent
Weber et al.

(10) Patent No.: US 7,133,812 B1
(45) Date of Patent: Nov. 7, 2006

(54) METHOD OF PARAMETIC DESIGN OF AN INSTRUMENT PANEL SUPPORT STRUCTURE

(75) Inventors: William Francis Weber, Bloomfield Hills, MI (US); Michael Joseph Walraven, Ypsilanti, MI (US); Jared Clark, Livonia, MI (US); Daniel Cornelius Bach, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 499 days.

(21) Appl. No.: 09/385,739

(22) Filed: Aug. 30, 1999

(51) Int. Cl.
G06G 7/48 (2006.01)

(52) U.S. Cl. .................. 703/8; 703/6; 703/7; 345/419; 345/420; 345/441

(58) Field of Classification Search .................. 706/45; 703/8, 6, 7
See application file for complete search history.

(56) References Cited

U.S. PATENT DOCUMENTS

| | | | |
|---|---|---|---|
| 4,696,225 A | 9/1987 | Weller | |
| 4,882,692 A * | 11/1989 | Saxton et al. | 345/441 |
| 5,031,111 A | 7/1991 | Chao et al. | |
| 5,119,309 A * | 6/1992 | Cavendish et al. | 345/420 |
| 5,197,120 A * | 3/1993 | Saxton et al. | 345/441 |
| 5,291,748 A | 3/1994 | Ueda | |
| 5,293,479 A * | 3/1994 | Quintero et al. | 345/841 |
| 5,631,861 A | 5/1997 | Kramer | |
| 5,754,738 A | 5/1998 | Saucedo et al. | |
| 5,792,031 A | 8/1998 | Alton | |
| 5,793,382 A | 8/1998 | Yerazunis et al. | |
| 5,799,293 A * | 8/1998 | Kaepp | 706/45 |
| 5,831,584 A | 11/1998 | Socks et al. | |
| 5,846,086 A | 12/1998 | Bizzi et al. | |
| 5,856,828 A | 1/1999 | Letcher, Jr. | |
| 5,920,320 A | 7/1999 | Shimizu | |
| 5,921,780 A | 7/1999 | Myers | |
| 5,930,155 A | 7/1999 | Tohi et al. | |
| 5,963,891 A | 10/1999 | Walker et al. | |
| 6,021,270 A | 2/2000 | Hanaki et al. | |
| 6,036,345 A | 3/2000 | Jannette et al. | |
| 6,037,945 A | 3/2000 | Loveland | |
| 6,084,590 A | 7/2000 | Robotham et al. | |
| 6,090,148 A * | 7/2000 | Weber et al. | 703/8 |
| 6,096,086 A * | 8/2000 | Weber et al. | 345/419 |
| 6,096,087 A * | 8/2000 | Weber et al. | 703/8 |
| 6,110,216 A * | 8/2000 | Weber et al. | 703/8 |
| 6,113,643 A * | 9/2000 | Weber et al. | 703/8 |
| 6,113,644 A * | 9/2000 | Weber et al. | 703/8 |
| 6,253,167 B1 | 6/2001 | Matsuda et al. | |

(Continued)

OTHER PUBLICATIONS

"Rapid: Prototyping Control Panel Interfaces" K. Freburger, OOPSLA Proceedings, ACM 0-89791-247-0/87/0010-0416, 1987.*

(Continued)

*Primary Examiner*—Fred Ferris
(74) *Attorney, Agent, or Firm*—David B. Kelley; Bliss McGlynn

(57) ABSTRACT

A method of parametric design of an instrument panel support structure for an instrument panel on a vehicle includes the step of determining an input parameter, such that the input parameter is a three dimensional coordinate defining the instrument panel support structure relative to the vehicle. The method also includes the step of generating a design of the instrument panel support structure using the input parameter and determining if the design of the instrument panel support structure meets a predetermined criteria. The method further includes the step of modifying the input parameter if the design of the instrument panel support structure does not meet the predetermined criteria.

8 Claims, 12 Drawing Sheets

U.S. PATENT DOCUMENTS

| | | |
|---|---|---|
| 6,273,724 B1 | 8/2001 | Roytman |
| 6,307,576 B1 | 10/2001 | Rosenfeld |
| 6,415,851 B1 | 7/2002 | Hall et al. |
| 6,420,698 B1 | 7/2002 | Dimsdale |
| 6,477,517 B1 | 11/2002 | Limaiem et al. |
| 6,477,518 B1 | 11/2002 | Li et al. |
| 6,482,082 B1 | 11/2002 | Derleth et al. |
| 6,487,525 B1 | 11/2002 | Hall et al. |
| 6,510,357 B1 | 1/2003 | Naik et al. |
| 6,556,196 B1 | 4/2003 | Blanz et al. |
| 6,577,308 B1 | 6/2003 | Ohto et al. |
| 6,636,234 B1 | 10/2003 | Endo et al. |
| 2002/0000996 A1 | 1/2002 | Trika |
| 2002/0140633 A1 | 10/2002 | Rafii et al. |

OTHER PUBLICATIONS

"Interactive Graphics Package for Human Engineering and Layout of Vehicle Workspace", G. Rabideau, ACM Special Interest Group on Design Automation, 1976.*

"Simulation-Aided Design of Man/Machine Interfaces in Automated Industries" G. Davis, IEEE: 81CH1709-5/81/0000, 1981.*

Lehner et al., "Distributed Virtual Reality: Supporting Remote Collaboration in Vehicle Design", IEEE 1997.

Purschke et al., "Virtual Reality-New Methods for Improving and Accelerating the Development Process in Vehicle Styling and Design", IEEE 1998.

"The Introduction of Knowledge based Engineering for Design for Manufacture in the Automotive Industry", G.S. Wallace, Successful Cases of Integrated Product Design with Manufacturing Technology (Digest No: 1997/168), IEE Colloquium on, pp. 7/1-7/5, May 1997.

"Knowledge Based Total Product Engineering", A.P. Harper, Successful Cases of Integrated Product Design with Manufacturing Technology (Digest No: 1997/168), IEE Colloquium on, pp. 5/1-5/2, May 1997.

Lafon, "Solid Modeling With Constraints and Parameterised Features", IEEE, Jul. 1998.

Jinsong et al., "Parametric Design with Intelligence Configuration Analysis Mechanism", IEEE, Nov. 1993.

Mateos et al., "Parametric and Associative Design of Cartridges for Special Tools", IEEE 1995.

M. E. Gleason et al., "Automotive Climate Control Simulation Using CFD", Cray Channels, vol. 16, No. 2, 1994, pp. 4-7, XP008018557.

E. Augier, "Numerical and Experimental Study of Airflow In A HVAC Module", International Symposium on Automotive Technology and Automation, Jun. 3, 1996, pp. 59-66, XP008018546.

J. Currie, "Application of Computational Fluid Dynamics for the Optimization of Air Ducts" Isata 29th International Symposium on Automotive Technology and Automation, Proceedings of Conference on Supercomputer Applications in the Transportation Industries, Florence, Italy, Jun. 3-6, 1996, pp. 115-123, XP008021112 1996, Croydon, United Kingdom Automotive Autom, United Kingdom.

G. Anderson et al., "Computational Fluid Dynamics (CFD)", Engineering Designer, Mar.-Apr. 1997, Instn. Eng. Designers, United Kingdom, vol. 23, No. 2, pp. 16-17, XP008021114, ISSN: 0013-7898.

T. D. Hogg, "Rapid Prototyping Through Computational Fluid Dynamics (CFD)", Fifth International Conference on Factory 2000—The Technology Exploitation Process (Conf. Publ. No. 435), Cambridge, United Kingdom, Apr. 2-4, 1997, pp. 113-117, XP002252364 1997, London, United Kingdom, IEE, United Kingdom ISBN: 0-85296-682-2.

Artificial Intelligence (Understanding Computers), by Time-Life Books, 1986, ISBN 0-8094-5675-3, pp. 36-43. Juran on Quality by Design, by J.M. Juran, The Free Press, 1992, ISBN 0-02-916683-7, pp. 406-427, and 462-467. The Computer Science and Engineering Handbook, by Allen B. Tucker, CRC Press, ISBN: 0-8493-2909-4, 1996, p. 1954.

\* cited by examiner

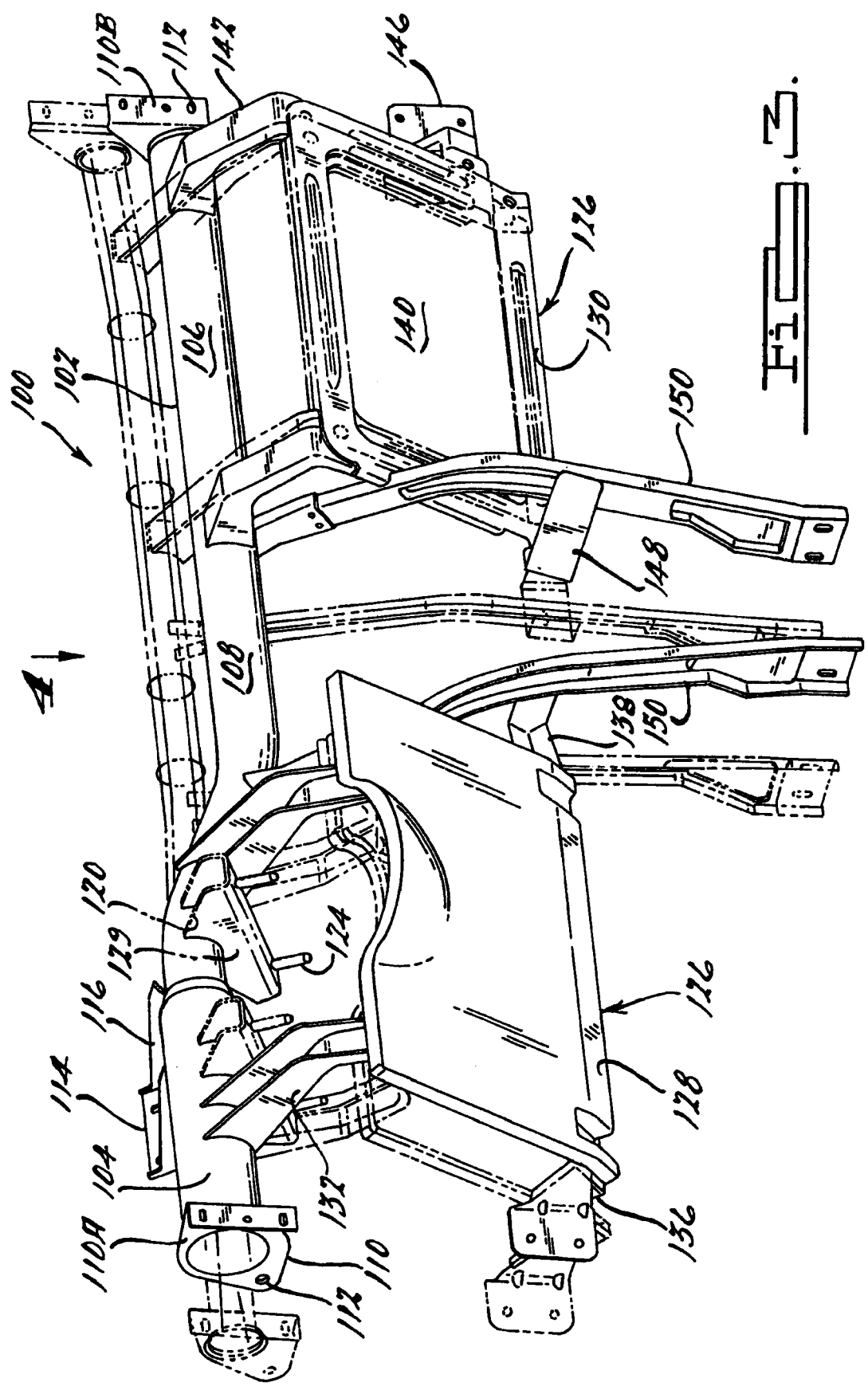

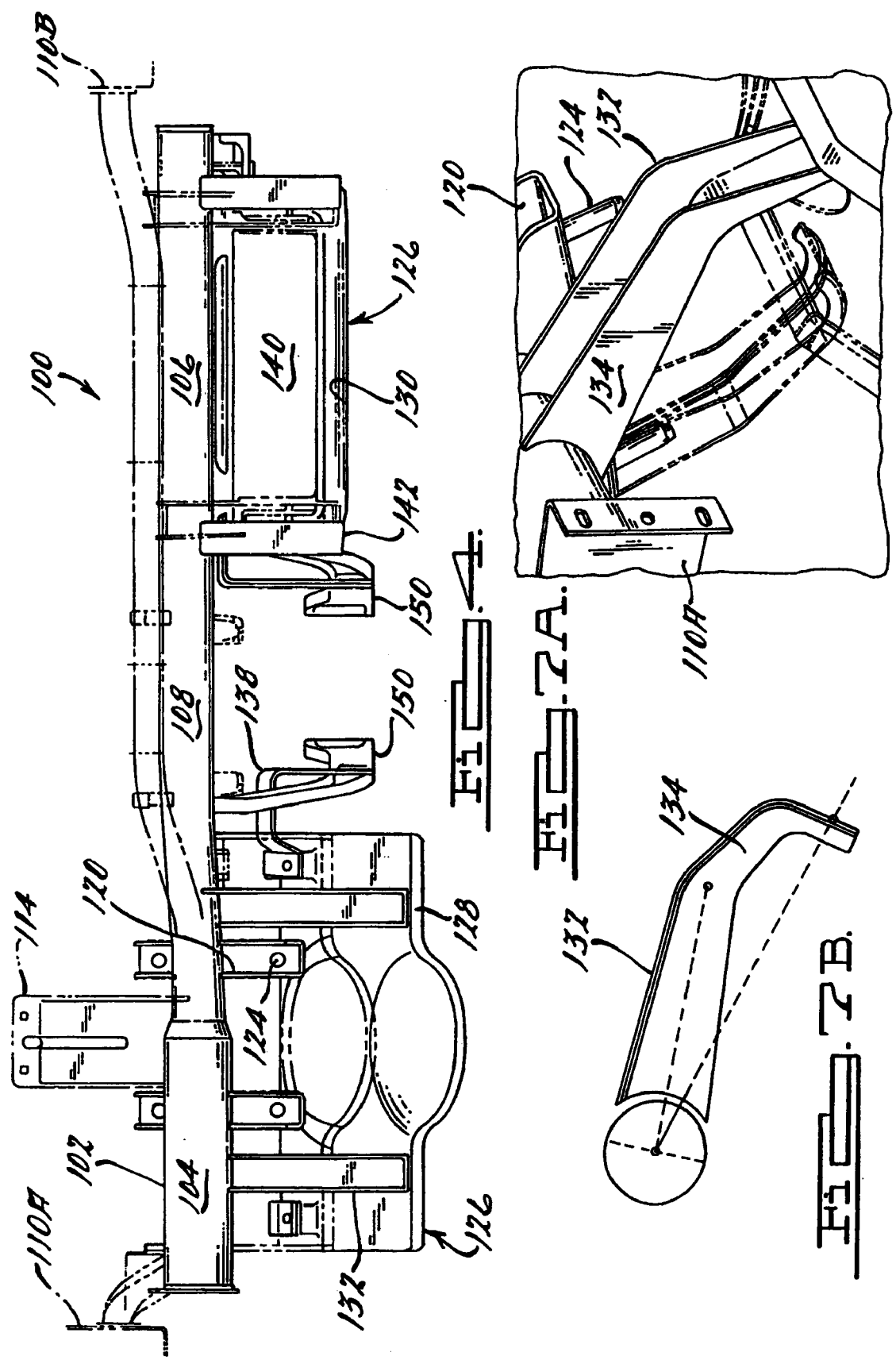

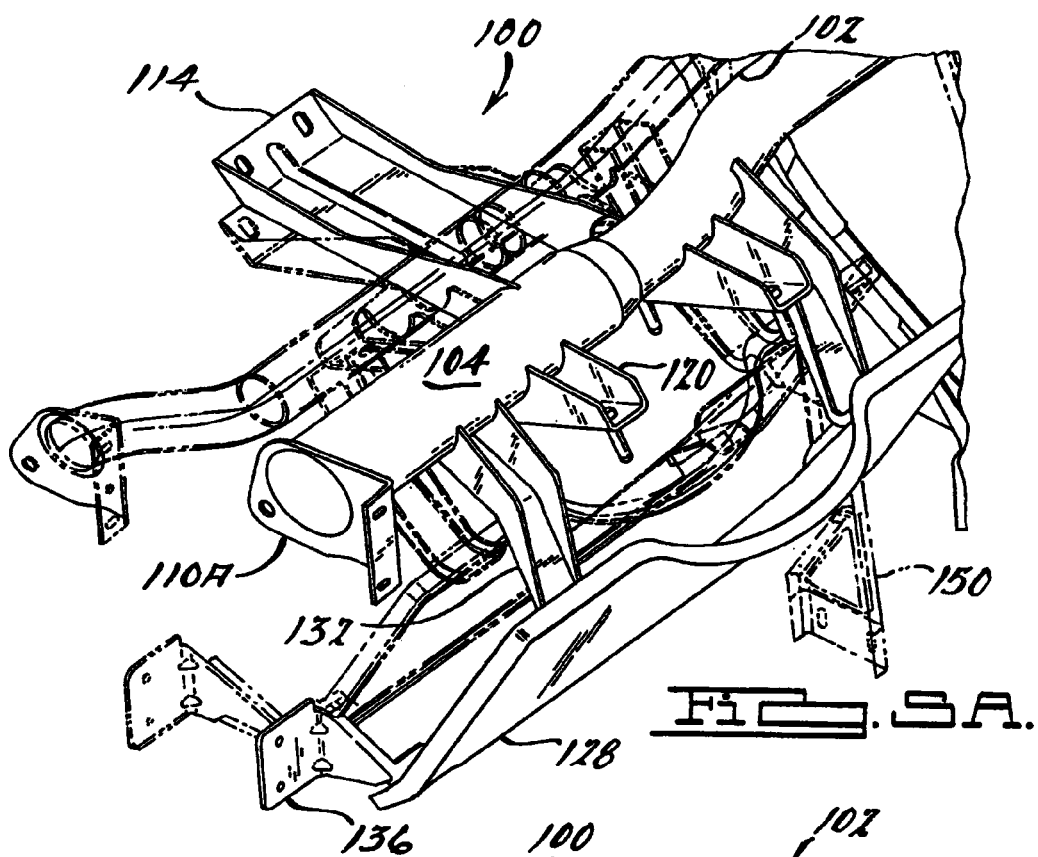
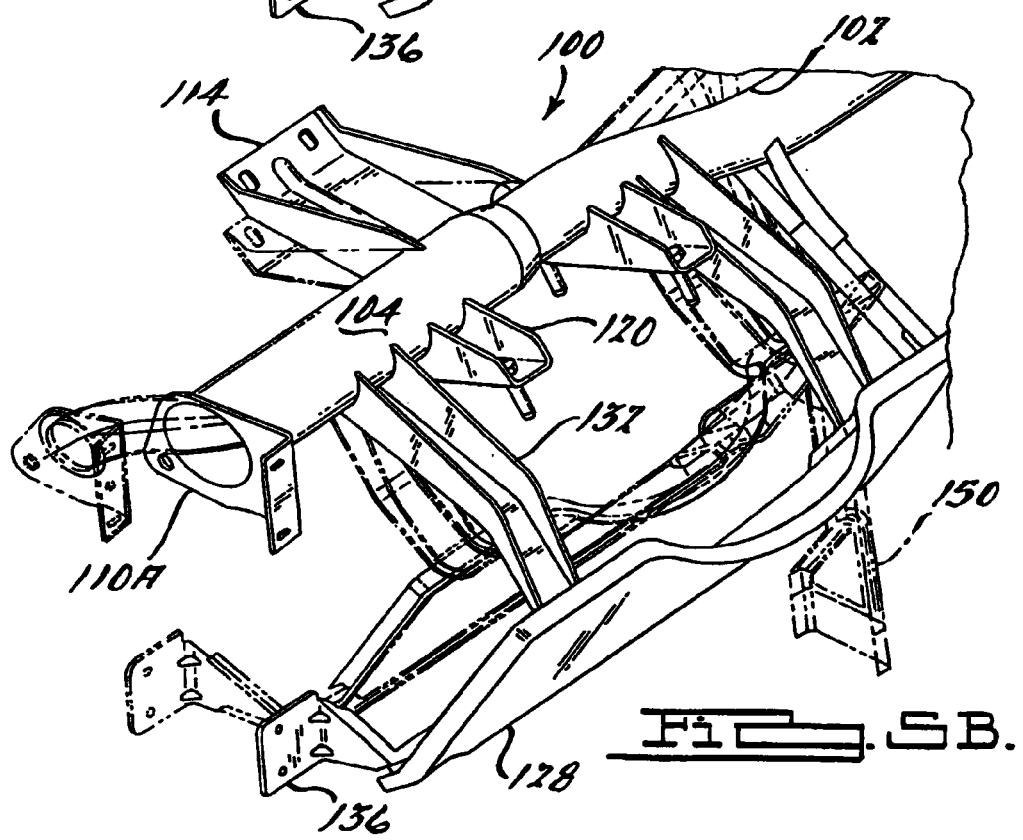

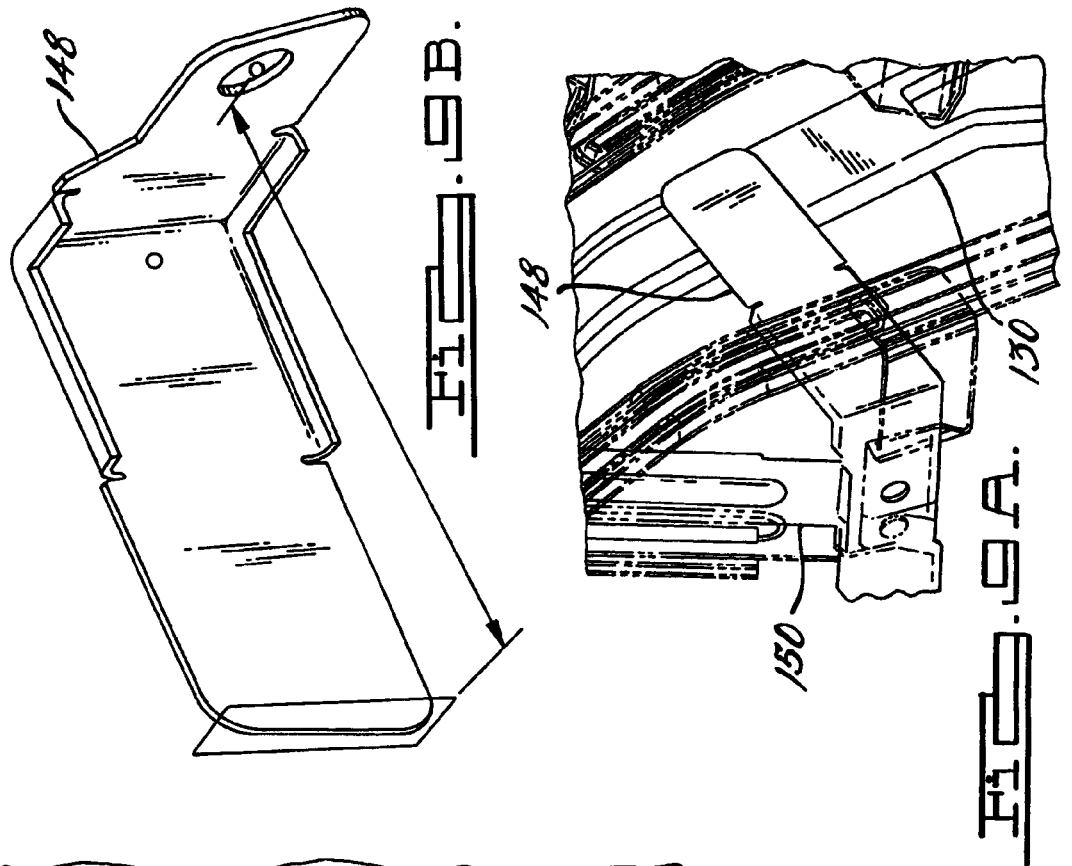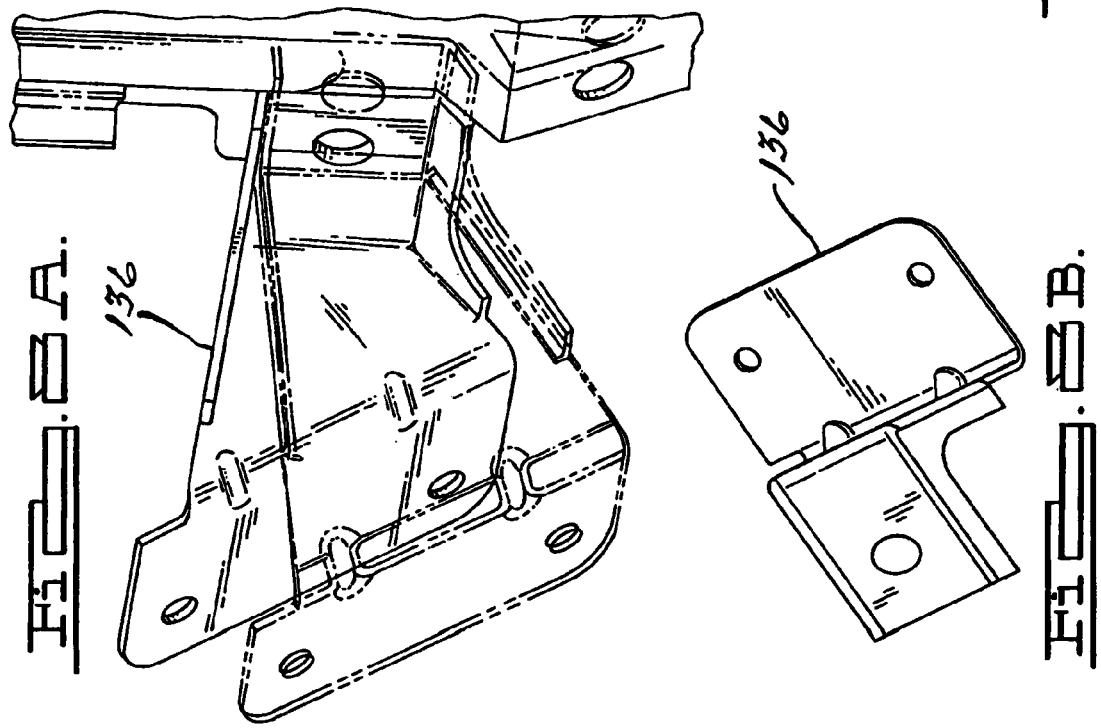

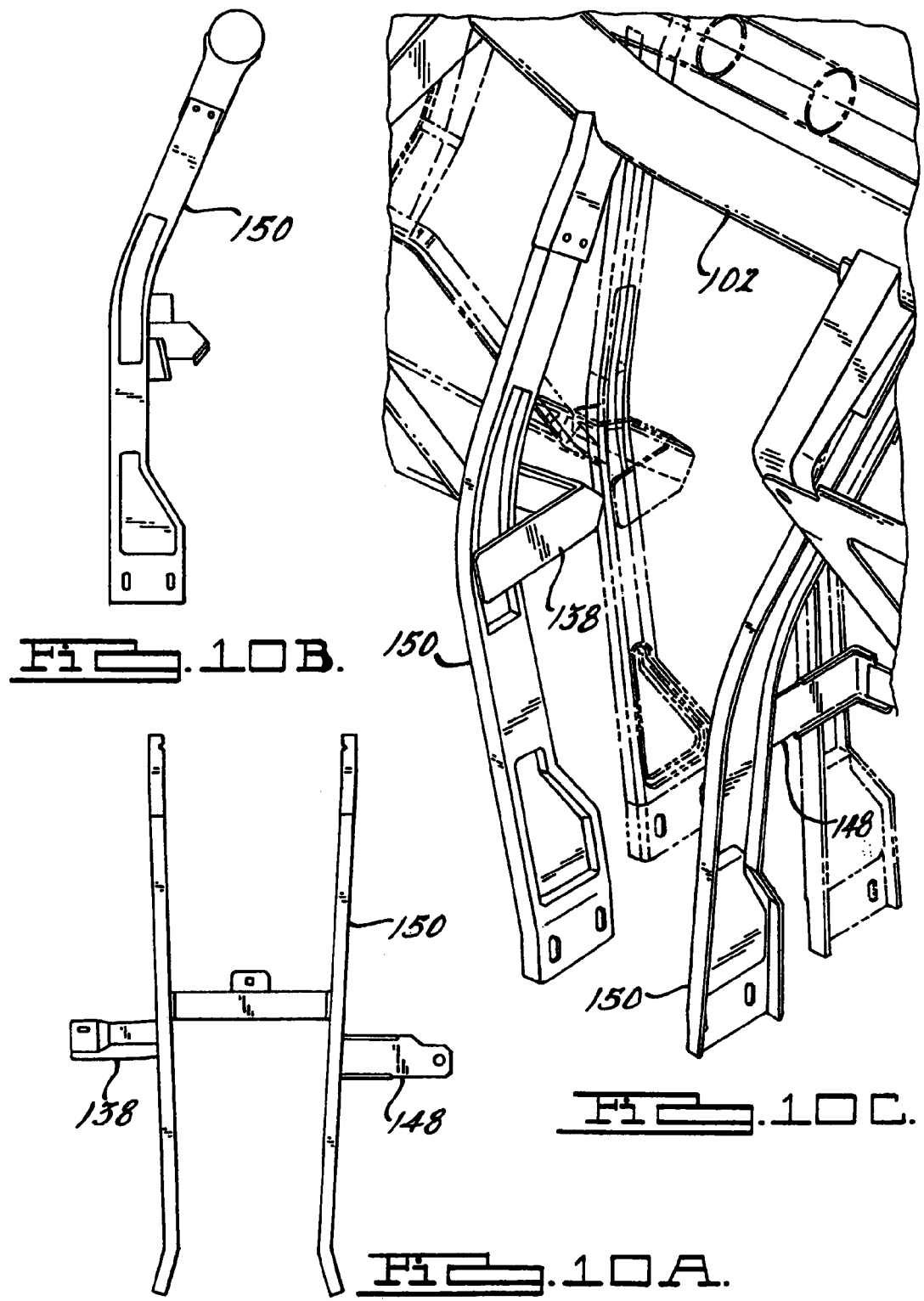

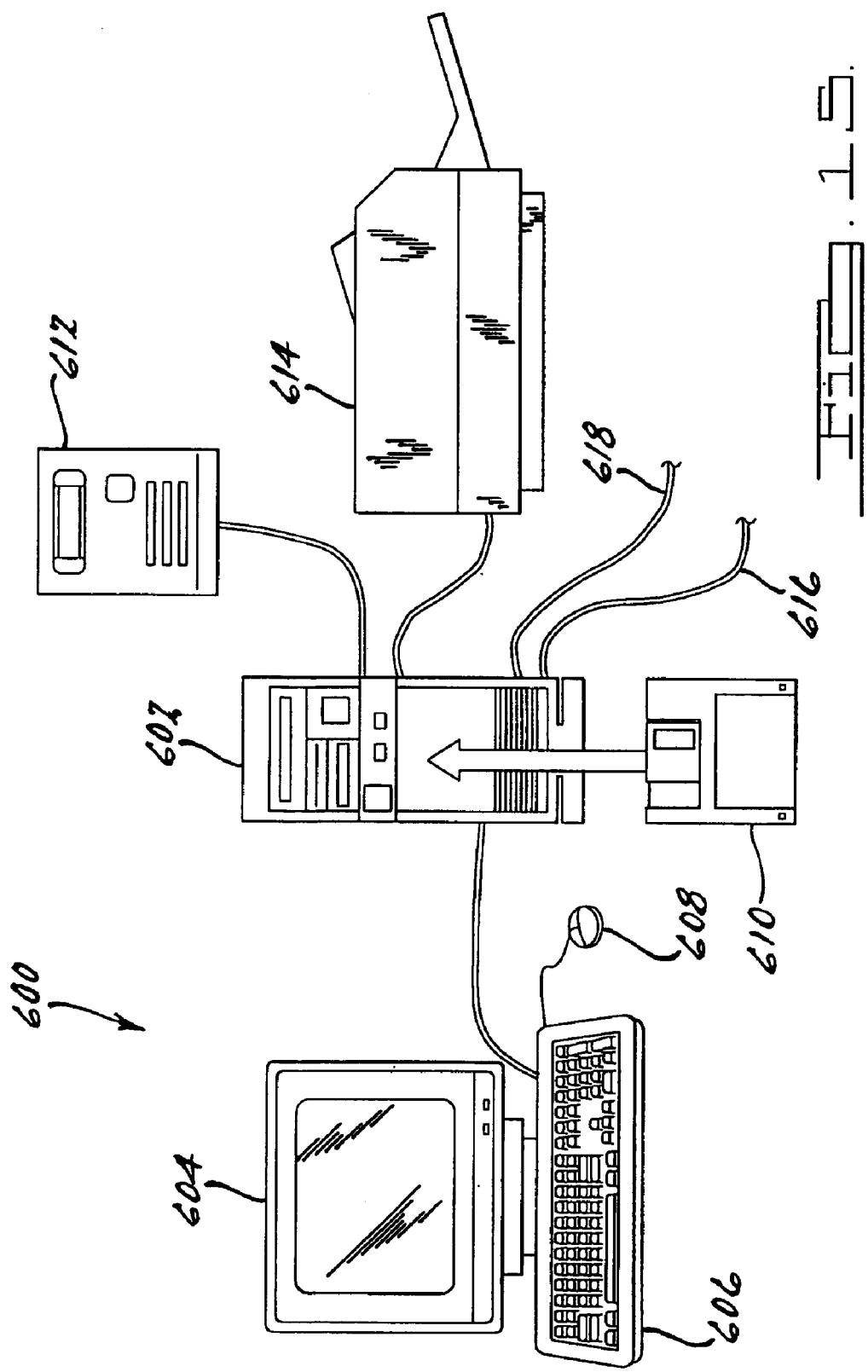

US 7,133,812 B1

METHOD OF PARAMETIC DESIGN OF AN INSTRUMENT PANEL SUPPORT STRUCTURE

BACKGROUND OF THE INVENTION

1. Field of the Invention

The present invention relates generally to computer-aided design of vehicles and, more specifically, to a method of parametric design of an instrument panel support structure for an instrument panel on a vehicle.

2. Description of the Related Art

Vehicle design, and in particular automotive vehicle design, has advanced to a state in which computer-aided design techniques are frequently incorporated in the development of a new vehicle. Computer-aided design is especially beneficial in packaging the various systems incorporated within a vehicle, to maximize design and functional capabilities of the vehicle systems. One example of a vehicle system is the instrument panel support structure for an instrument panel. The instrument panel support structure is positioned between a side structure of the vehicle and provides structural reinforcement for a vehicle body. The instrument panel support structure also provides an attachment surface for various vehicle components such as an instrument panel, an inflatable restraint system, or a heating, ventilation and air conditioning HVAC system.

One aspect of the packaging task for a vehicle system, such as the instrument panel support structure, is to ensure that it is spatially compatible with a particular environment, while still complying with predetermined functional criteria, including performance and durability requirements. In the past, various methods have been utilized to determine whether a proposed design meets such predetermined criteria. For example, a proposed design may be analyzed in two dimensions, which requires many iterations of a drawing. A three-dimensional model may also be constructed to obtain a better perspective of the design. The three-dimensional model may further be subjected to testing to determine whether it complies with performance and durability criteria. This method is time consuming and expensive.

It is also known that design methods that are knowledge-based are being utilized to design a vehicle system. The knowledge-based design method provides advice to the user of the method based on the environment of the design application used. Advantageously, knowledge-based design techniques maximize the amount of knowledge utilized, while developing a new vehicle system in a minimal period of time. An example of a knowledge-based design technique is disclosed in U.S. Pat. No. 5,799,293 to Kaepp, entitled "Method For Optimizing The Design Of A Product Using Knowledge Based Engineering Techniques", the disclosure of which is hereby incorporated by reference.

It is also known to use a computer-aided design technique to design a vehicle system. An example of a computer aided design technique is disclosed in U.S. patent application Ser. No. 08/984,806, entitled "Method and System For Vehicle Design Using Occupant Reach Zones", the disclosure of which is also hereby incorporated by reference.

While the above design techniques work well, they do not take into account the particular functional and packaging criteria associated with designing an instrument panel support structure. Therefore, there is a need in the art to provide a method for designing an instrument panel support structure for an instrument panel on a vehicle using a parametric design technique that accommodates functional and packaging criteria.

SUMMARY OF THE INVENTION

Accordingly, the present invention is a method of parametric design of an instrument panel support structure for an instrument panel on a vehicle. The method includes the step of determining an input parameter, such that the input parameter is a three dimensional coordinate defining the instrument panel support structure relative to the vehicle. The method also includes the step of generating a design of the instrument panel support structure using the input parameter and determining if the design of the instrument panel support structure meets a predetermined criteria. The method further includes the step of modifying the input parameter if the design of the instrument panel support structure does not meet the predetermined criteria.

One advantage of the present invention is that an improved method of designing an instrument panel support structure for an instrument panel on a vehicle is provided that uses a parametric design technique to considerably reduce design time and related expenses. Another advantage of the present invention is that a method of parametric design of an instrument panel support structure is provided that considers packaging criteria. Yet another advantage of the present invention is that a method of designing a instrument panel support structure is provided that allows further analysis of vehicle packaging feasibility early in the design process. Still another advantage of the present invention is that a method of parametric design of an instrument panel support structure is provided which supports computer-aided engineering analysis (CAE) and rapid prototyping. A further advantage of the present invention is that a method of parametric design of an instrument panel support structure is provided that enhances flexibility in design, while still meeting vehicle timing considerations. Still a further advantage of the present invention is that a method of parametric design of an instrument panel support structure is provided that utilizes parametric automated design in light of predetermined criteria.

Other features and advantages of the present invention will be readily appreciated, as the same becomes better understood after reading the subsequent description taken in conjunction with the accompanying drawings.

BRIEF DESCRIPTION OF THE DRAWINGS

FIG. 3 is a perspective view of two parametric designs of the instrument panel support structure of FIG. 2.

FIG. 4 is a plan view of two parametric designs of the instrument panel support structure of FIG. 3.

FIG. 5A is a perspective view of two parametric designs of a driver side portion of the instrument panel support structure of FIG. 2, using an occupant H-point as a reference point.

FIG. 5B is a perspective view of two parametric designs of a driver side portion of the instrument panel support structure of FIG. 2, without using the occupant H-point as a reference point.

FIG. 7A is a perspective view of two parametric designs of an upper driver side knee bolster attachment bracket for the instrument panel support structure of FIG. 2.

FIG. 7B is a side view of the upper driver side knee bolster attachment bracket.

FIG. 8A is a perspective view of two parametric designs of an outer driver side knee bolster attachment bracket, for the instrument panel support structure of FIG. 2.

FIG. 8B is a plan view of the outer driver side knee bolster attachment bracket of FIG. 8A.

FIG. 9A is a perspective view of two parametric designs of an inner passenger side knee bolster attachment bracket, for the instrument panel support structure of FIG. 2.

FIG. 9B is a perspective view of two parametric designs of the inner passenger side knee attachment support bracket of FIG. 9A.

FIG. 10A is a plan view of a center support bracket for the instrument panel support structure of FIG. 2.

FIG. 10B is a side view of the center support bracket of FIG. 10A.

FIG. 10C is a perspective view of two parametric designs of the instrument panel support structure of FIG. 10A, using a diameter of a cross car support beam as a reference point.

FIG. 15 is a view of a system for parametric design of the instrument panel support structure on a vehicle, according to the present invention.

DESCRIPTION OF THE PREFERRED EMBODIMENT(S)

Vehicle design, and in particular the design of an instrument panel support structure on a vehicle, is achieved according to the present invention with a generic parametric driven design process. Advantageously, this process allows flexibility in vehicle design and engineering analysis of the design in a fraction of the time required using conventional design methods. Various computer based tools are integrated to achieve this enormous time and expense savings, including solid modeling, parametric design, automated studies and a non-parametric components library, also referred to as a standard parts library.

Figure 1:
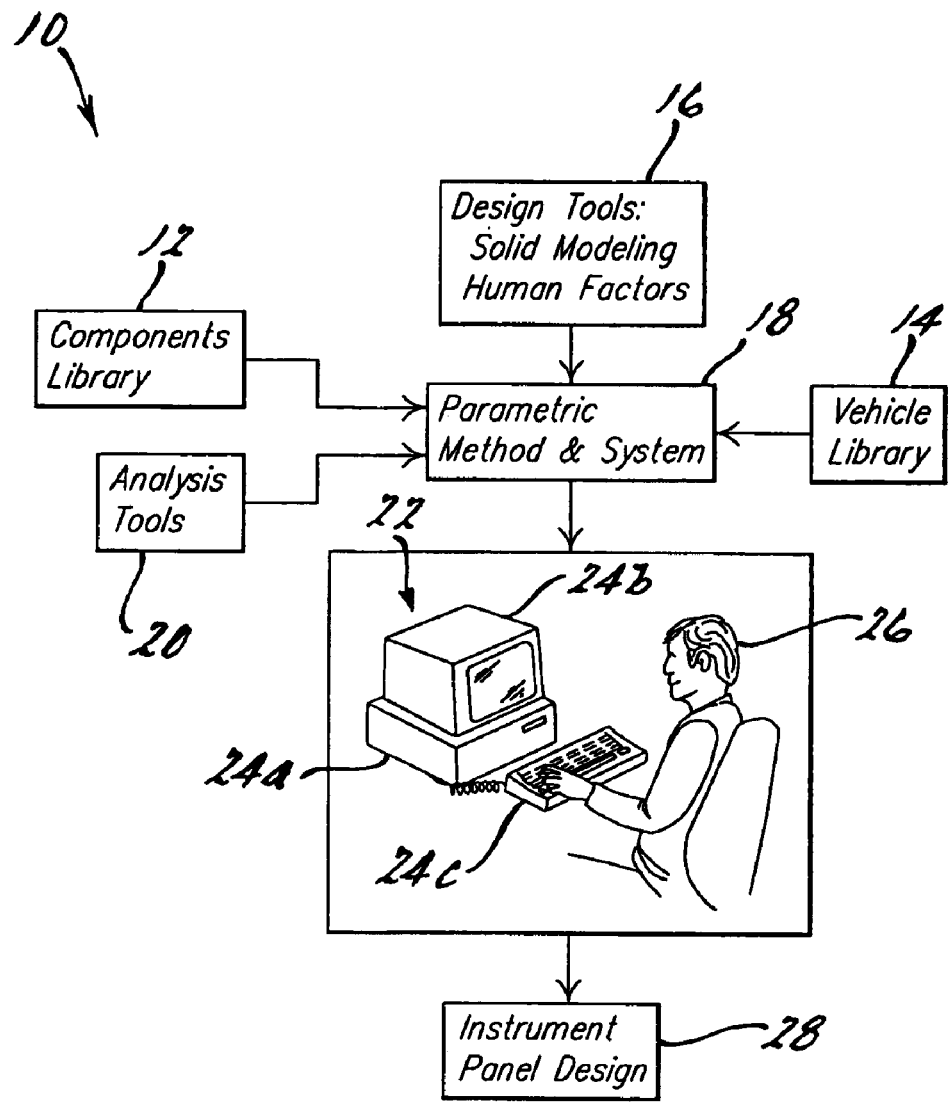
FIG. 1 is a block diagram of a system which may be utilized with a method of parametric design of an instrument panel support structure for a vehicle, according to the present invention.

Referring to the drawings and in particular FIG. 1, the tools 10 used by a method 18 for designing a instrument panel support structure, according to the present invention, are illustrated graphically. The tools 10 include a component parts library 12 stored on an electronic storage device (not shown). The component parts library 12 is a database providing an electronic representation of various types of component parts that may be supported by an instrument panel support structure, in a manner to be described. The component parts library 12 also includes information in electronic form regarding various types of instrument panel support structure architectures, to be described, that are available. Packaging studies incorporating these component parts on the instrument panel support structure can be done to assess many factors relating to the design of the instrument panel support structure.

The tools 10 also include a vehicle platform library 14 stored on the electronic storage device. The vehicle platform library 14 is an electrical representation of a vehicle platform or a portion thereof. For example, the vehicle platform library 14 may include information regarding a particular vehicle body design, to be described. It should be appreciated that the vehicle platform library 14 and component parts library 12 may be stored on the same electronic storage device.

The tools 10 may also include various design tools, generally indicated at 16, which can be used for the method 18, in a manner to be described. These design tools 16 may include solid modeling and parametric design techniques. Solid modeling, for example, takes electronically stored vehicle platform data from the vehicle platform library 14 and standard component parts data from the component parts library 12 and builds complex geometry for part-to-part or full assembly interference checking. Several modeling programs are commercially available and generally known to those skilled in the art.

The parametric design technique is used in the electronic construction of vehicle geometry within a computer system 22, to be described, for designing a vehicle system, such as the instrument panel support structure. As a particular dimension or parameter is modified for a particular feature of the instrument panel support structure, the computer system 22 is instructed to regenerate a new vehicle or part geometry. The parametric instrument panel information, generally indicated at 14, control and limit the design process in accordance with predetermined design parameters, to be described.

The tools 10 also include various computer-aided engineering (CAE) analysis methods 20. One example of an engineering analysis technique is a human factors study, to be described.

The tools 10 further include a computer system 22 as is known in the art to implement the method 18. The computer system 22 includes a processor and a memory 24a, which can provide a display and animation of a system, such as the instrument panel support structure, on a display such as a video terminal 24b. Parametric selection and control for the design can be achieved by a user 26, via a user interactive device 24c, such as a keyboard or a mouse. The user 26 inputs a set of parameters and set of instructions into the computer 24a when prompted to do so. The set of parameters and the set of instructions may be product specific, wherein other data and instructions non-specific to the product may already be stored in the computer 24a.

One example of an input method is a pop-up window with all current parameters, including an on-line description for the parameter and a current value therefore. For example, parametric values may be chosen from a table within a two-dimensional mode, since some vehicle designers prefer to view an assembly in sections which can be laid out on a drawing.

Once the computer system 22 receives the set of parameters and instructions from the user 26, and any information regarding related vehicle systems and information from the libraries 12, 14, the computer system 22 utilizes the method 18, discussed in detail subsequently, to determine whether requirements have been met.

Advantageously, the computer implemented method of parametric design of an instrument panel support structure combines all of the foregoing to provide an efficient, flexible, and rapid design 28. Further, an instrument panel support structure design is an output of the method 18, and the design is available for further analysis and study.

Referring to FIGS. 2 through 10, an instrument panel support structure 100, according to the present invention, is illustrated for an instrument panel (not shown) on a vehicle (not shown), and in particular an automotive vehicle. The vehicle includes a vehicle body (not shown) which serves as a frame for the vehicle, as is known in the art. The vehicle body includes two side structures, (not shown) which are referred to in the art as A-pillars. The vehicle body also includes a front structure (not shown), known as the dash panel, that forms a generally planar surface extending between the side structures. It should be appreciated that the vehicle front structures and side structure define an interior space of the vehicle referred to as the occupant compartment. The vehicle body includes a generally planar member, (not shown) positioned between the side structures and extending from an upper edge of the dash panel into the occupant compartment, referred to in the art as a cowl. The instrument panel support structure 100 is positioned between the side structures and rearward of the cowl, and attached to the vehicle in a manner to be described. Advantageously, the instrument panel support structure 100 provides an attachment surface for components typically disposed within the instrument panel, as is known in the art.

The instrument panel support structure 100 includes a longitudinally extending beam 102, referred to in the art as a cross-car support beam. The beam 102 provides rigidity and support to the vehicle body and an attachment surface for various components, in a manner to be described. The beam 102 may be divided into a driver side portion 104 on one end, and a passenger side portion 106 on another end, and a central portion 108 between the passenger side portion 106 and the driver side portion 104.

Figure 2:
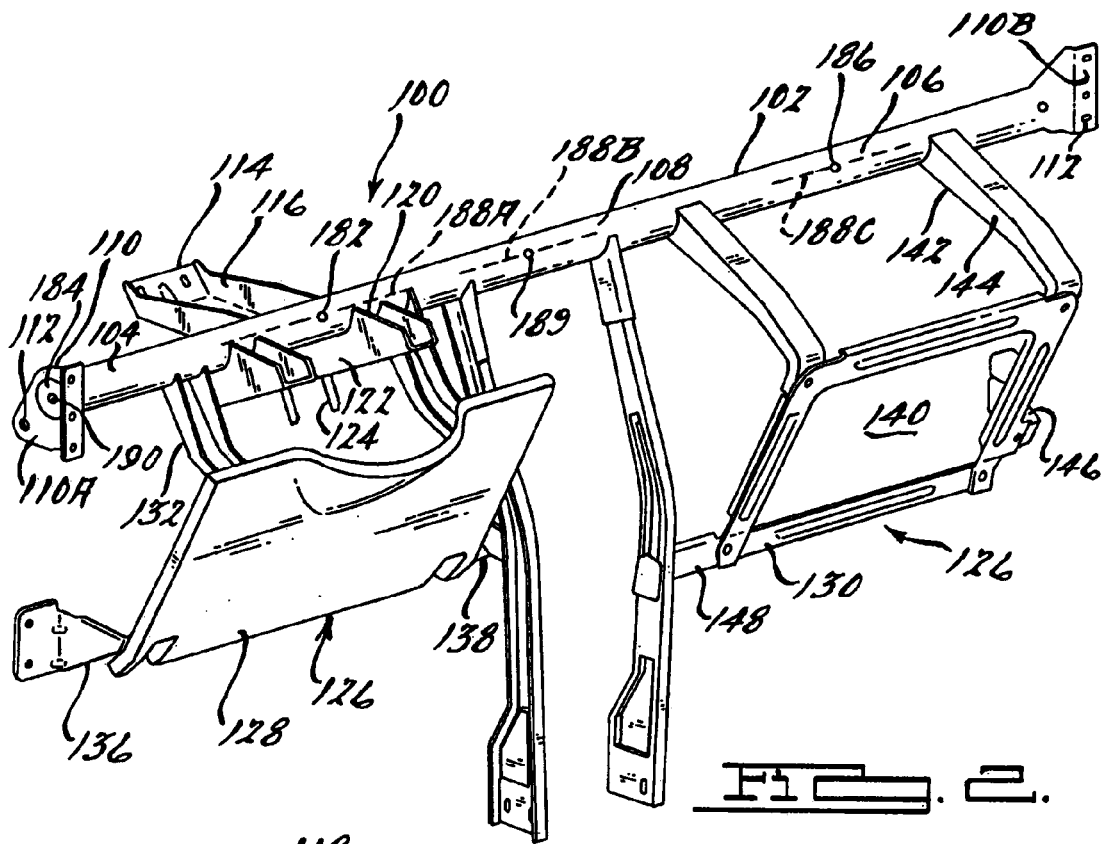
FIG. 2 is a perspective view of an instrument panel support structure for an instrument panel on a vehicle designed by a method, according to the present invention.

Referring to FIGS. 2, 3 and 4, the shape of the beam 102 is parametrically determined in light of various input parameters that associatively link a parameter to a coordinate in space. For example, an input parameter is a dimensional coordinate for the attachment locations of the beam 102 relative to the vehicle body. Another input parameter is the axis of the beam 102. Still another input parameter is the relative shape of the vehicle body and related components. As illustrated, a regenerated beam design is illustrated in dot-dash lines. It should be appreciated that the beam 102 may include a bend in the regenerated design to provide dimensional clearance between the beam 102 and another part of the vehicle. As shown in FIG. 5A, the design of the beam 102 parametrically references the occupant H-point. Similarly, in FIG. 5B the design of the beam 102 does not reference the H-point.

The beam 102 includes an end bracket 112 for attaching the beam 102 to part of the vehicle body, such as the cowl in this example. The end bracket 110 is generally planar, and is joined onto an end of the beam 102, using a suitable means such as welding. Preferably, there is a left end bracket 110A located on the end of the driver side portion 104 of the beam 102 and a right end bracket 110B located on the end of the passenger side portion 106 of the beam 102. The left and right end brackets 110A, 110B may each include an aperture 112 for receiving a fastener (not shown), such as a bolt, to secure the beam 102 to the cowl.

In this example, the left or right end brackets 110A, 110B have a general "L" shape. It should be appreciated that the left end bracket 110A may have a different shape than the right end bracket 110B, depending on the design of the beam 102. Advantageously, the shape of the right or left end bracket 110A, 110B is parametrically determined in light of mating associative parts defining the attachment location of the beam 102 relative to the vehicle body.

Figure 6A:
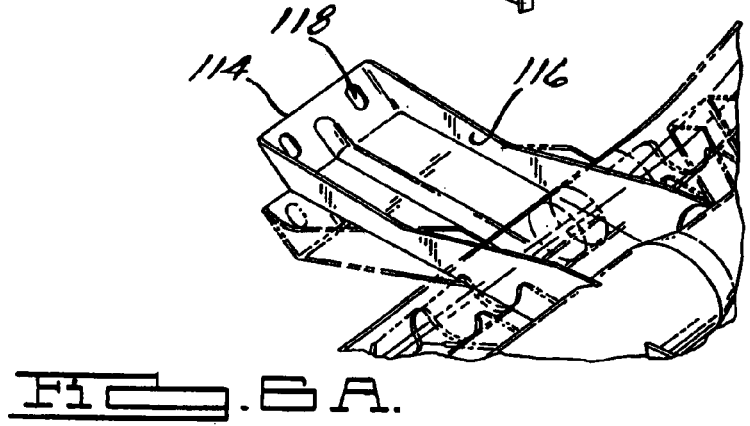
FIG. 6A is a perspective view of two parametric designs of an upper attachment bracket for the instrument panel support structure of FIG. 2.
Figure 6B:
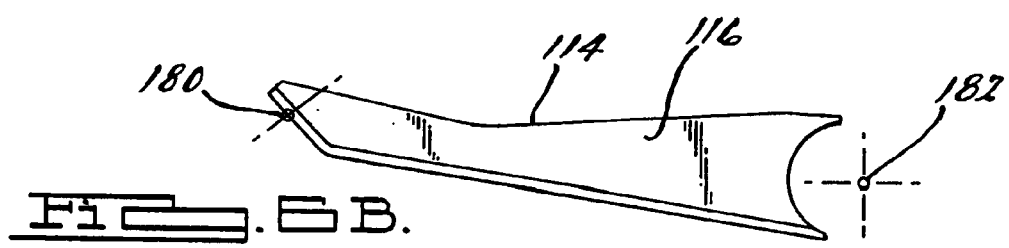
FIG. 6B is a side view of the upper attachment bracket of FIG. 6A.

Referring to the FIGS. 6A and 6B the instrument panel support structure 100 also includes an upper attachment bracket 114, also referred to as a cowl top bracket, for attaching the beam 102 to the cowl. The upper attachment bracket 114 is generally planar and extends radially from the beam 102 a sufficient distance to secure the instrument panel support structure 100 to the cowl. The upper attachment bracket 102 may include a flange 116 extending from a side edge of the upper attachment bracket 114 to provide additional strength to the upper attachment bracket 114.

In this example, the upper attachment bracket 114 has a general "J" shape. Advantageously, the shape of the upper attachment bracket 114 is parametrically determined in light of using an input parameter such as a coordinate point in 3-dimensional space representing an attachment location of the cowl to the vehicle body structure. Another end of the upper attachment bracket 114 is associatively referenced to another input parameter such as a centerline for the beam 102. A regenerated design is illustrated in dot-dash lines in FIG. 6A.

An end of the upper attachment bracket 114 is secured to the beam 102 by a suitable means such as welding. Another end of the upper attachment bracket 114 is secured to the cowl by a suitable means such as a fastener (not shown). The upper attachment bracket 114 includes an aperture 118 for receiving the fastener to secure the upper attachment bracket 114 to the cowl.

The instrument panel support structure 100 also includes a steering column support bracket 120 for supporting the steering column (not shown), as is known in the art. The steering column support bracket 120 is a generally planar member extending radially from the beam 102 a sufficient amount in a rearward vehicle direction. In this example, the steering column support bracket 120 has a flange 122 extending along a side edge to provide additional strength, so that the steering column support bracket 120 has a generally "U"-shape.

The shape of the steering column support bracket 120 may be parametrically determined in light of a mating associated part, such as the design of the beam 102 and a three dimensional coordinate representing a location for the steering column. An edge of the steering column support bracket 120 is attached to the beam 102 by a suitable means, such as welding. The steering column support bracket 120 may include a suitable means such as a fastener 124 to secure the steering column to the instrument panel support structure 100. It should be appreciated that, in this example, there are two steering wheel support brackets 120 positioned parallel each other.

The instrument panel support structure 100 also includes a knee bolster 126. The knee bolster absorbs energy of a portion of an occupant's body (not shown), such as a knee, under certain conditions. One example of a condition is the movement of an unrestrained occupant as a result of an impact with another object (not shown). In this example, there are two knee bolsters 126, a driver side knee bolster 128 and a passenger side knee bolster 130.

The driver side knee bolster 128 is a generally planar member that is attached to the driver side portion 104 of the instrument panel support structure 100 by a plurality of attachment brackets. The location in driver side space of the knee bolster is parametrically driven, and may depend on an input from the design tool 16, such as a result from a knee bolster study.

Referring to FIGS. 7A and 7B, an upper driver side knee bolster attachment bracket 132 interconnects an upper edge of the driver side knee bolster 128 with the beam 102. Advantageously, the upper driver side knee bolster attachment bracket 132 absorbs energy resulting from an impact with an object. The upper driver side knee bolster attachment bracket 132 is a generally planar member having a flange 134 extending along an edge to provide additional structural strength. The upper driver side knee bolster attachment bracket 132 has a generally J-shape. Advantageously, the shape of the upper driver side knee bolster attachment bracket 132 is parametrically determined in light of mating associative parts, including the knee bolster 128, and the diameter of the beam, as well as an input from the design tool 16 such as a knee bolster study.

Preferably, one end of the upper driver side knee bolster attachment bracket 132 is secured to the beam 102 using a suitable means such as welding. Another end is secured to the driver side knee bolster 128 using a suitable means such as a fastener (not shown). It should be appreciated that, in this example there are two upper driver side knee bolster attachment brackets 132.

Referring to FIGS. 8A and 8B an outer driver side knee bolster attachment bracket 136 secures an outer edge of the driver side knee bolster 128 to the vehicle body. The outer driver side knee bolster attachment bracket 136 is generally planar. In this example, the bracket 136 has a generally "Z"-shape. Advantageously, the shape of the outer driver side knee bolster attachment bracket 136 is parametrically referenced to the position and shape of the driver side knee bolster 128 relative to the vehicle body. Preferably, one end of the outer driver side knee bolster attachment bracket 136 is secured to the knee bolster 128 by a suitable means such as welding. Another end of the bracket 136 is also secured to the vehicle body by a suitable means such as a fastener (not shown).

An inner driver side knee bolster attachment bracket 138 secures an inner edge of the driver side knee bolster 128 with a center support bracket 150, to be described. The inner driver side knee bolster attachment bracket 138 is generally planar. In this example, the bracket 138 has a generally "L"-shape. Advantageously, the shape of the inner driver side knee bolster attachment bracket 138 is parametrically determined in light of its associativity to the position and shape of the driver side knee bolster 128 and a center support bracket 150 to be described. Therefore, the design can change the shape of the inner knee bolster attachment bracket 138 from a generally "L" to a generally "Z" shape. Preferably, one end of the inner driver side knee bolster attachment bracket 138 is secured to the knee bolster by a suitable means such as welding. Another end of the bracket 138 is also secured to the vehicle body by a suitable means such as a fastener (not shown).

The passenger side knee bolster 130 is a generally rectangular member extending from the passenger side portion 106 of the beam 102. In this example, the passenger side knee bolster 130 has a central cavity 140 for receiving a glove box member (not shown), as is known in the art. In this example, the location of the passenger side knee bolster 130 is parametrically driven by an input from the design tool 16, such as a knee bolster study, and associatively referenced to the beam 102.

The passenger side knee bolster 130 is secured to the beam 102 by an upper passenger side knee bolster attachment bracket 142. The upper passenger side knee bolster attachment bracket 142 interconnects an upper edge of the passenger side knee bolster 130 with the passenger side portion 106 of the beam 102. Advantageously, the upper passenger side knee bolster attachment bracket 142 also absorbs energy resulting from an impact with an object.

The upper passenger side knee bolster attachment bracket 142 is a generally planar member having a flange 144 extending along an edge to provide additional structural strength. The upper passenger side knee bolster attachment bracket 142 has a generally J-shape. In this example, the shape of the upper passenger side knee bolster attachment bracket 142 is parametrically determined in light of the position and orientation of mating surfaces of the beam 102 and the passenger side knee bolster 130, and an input from the design tool 16 such as a knee bolster study.

Preferably, one end of the upper passenger side knee bolster attachment bracket 142 is secured to the passenger side portion 106 of the beam 102 using a suitable means such as welding. Another end of the bracket 147 is secured to the passenger side knee bolster 130 using a suitable means such as a fastener (not shown). It should be appreciated that, in this example, there are two upper passenger side knee bolster attachment brackets 142.

An outer passenger side knee bolster attachment bracket 146 secures an outer edge of the passenger side knee bolster 130 with the vehicle body. The outer passenger side knee bolster attachment bracket 146 and outer driver side knee bolster attachment bracket 136 may have the same shape. The outer passenger side knee bolster attachment bracket 146 is generally planar. In this example, the bracket 146 has a generally "Z"-shape. Advantageously, the shape of the outer passenger side knee bolster attachment bracket 146 is parametrically associated with the passenger side knee bolster 130 and the vehicle body. Preferably, one end of the outer passenger side knee bolster attachment bracket 146 is secured to the passenger side knee bolster 130 by a suitable means such as welding. Another end of the bracket 146 is also secured to the vehicle body by a suitable means such as a fastener.

Referring back to FIGS. 9A and 9B, an inner passenger side knee bolster attachment bracket 148 secures an inner edge of the passenger side knee bolster 130 with the center support bracket 150. The inner passenger side knee bolster attachment bracket 148 is generally planar. In this example, the bracket 148 has a general "L"-shape. Advantageously, the shape of the inner passenger side knee bolster attachment bracket 148 is parametrically determined in a manner similar to the inner driver side knee bolster attachment bracket 142 previously described. Preferably, one end of the outer passenger side knee bolster attachment bracket 146 is secured to the passenger side knee bolster by a suitable means such as welding. Another end of the bracket 148 is also secured to the vehicle body by a suitable means such as a fastener (not shown).

Referring to FIGS. 10A, 10B and 10C, the instrument panel support structure 100 includes a center support bracket 150 extending between a central portion 108 of the beam 102 and a portion of the vehicle body such as a floor (not shown). The center support bracket 150 provides a mounting surface for a center component (not shown) disposed within the instrument panel, such as an audio component or a heating, ventilation and air conditioning HVAC controller, as is known in the art.

The center support bracket 150 is generally planar, and extends longitudinally a sufficient distance to provide support to components disposed therein. In this example, a side edge has a flange 152 extending therealong to enhance the structural integrity of the center support bracket 150. In this example, the center support bracket 150 is parametrically determined from input parameters such as the diameter of the beam, or the design tool 16 such as a reach study.

An upper end of the center support bracket 150 is secured to the beam 102 by a suitable means such as welding. A lower end of the center support bracket 150 is secured to the vehicle body by a suitable means such as a fastener (not shown). In this example, there are two center support brackets 150 positioned a predetermined distance apart from each other.

Figure 11:
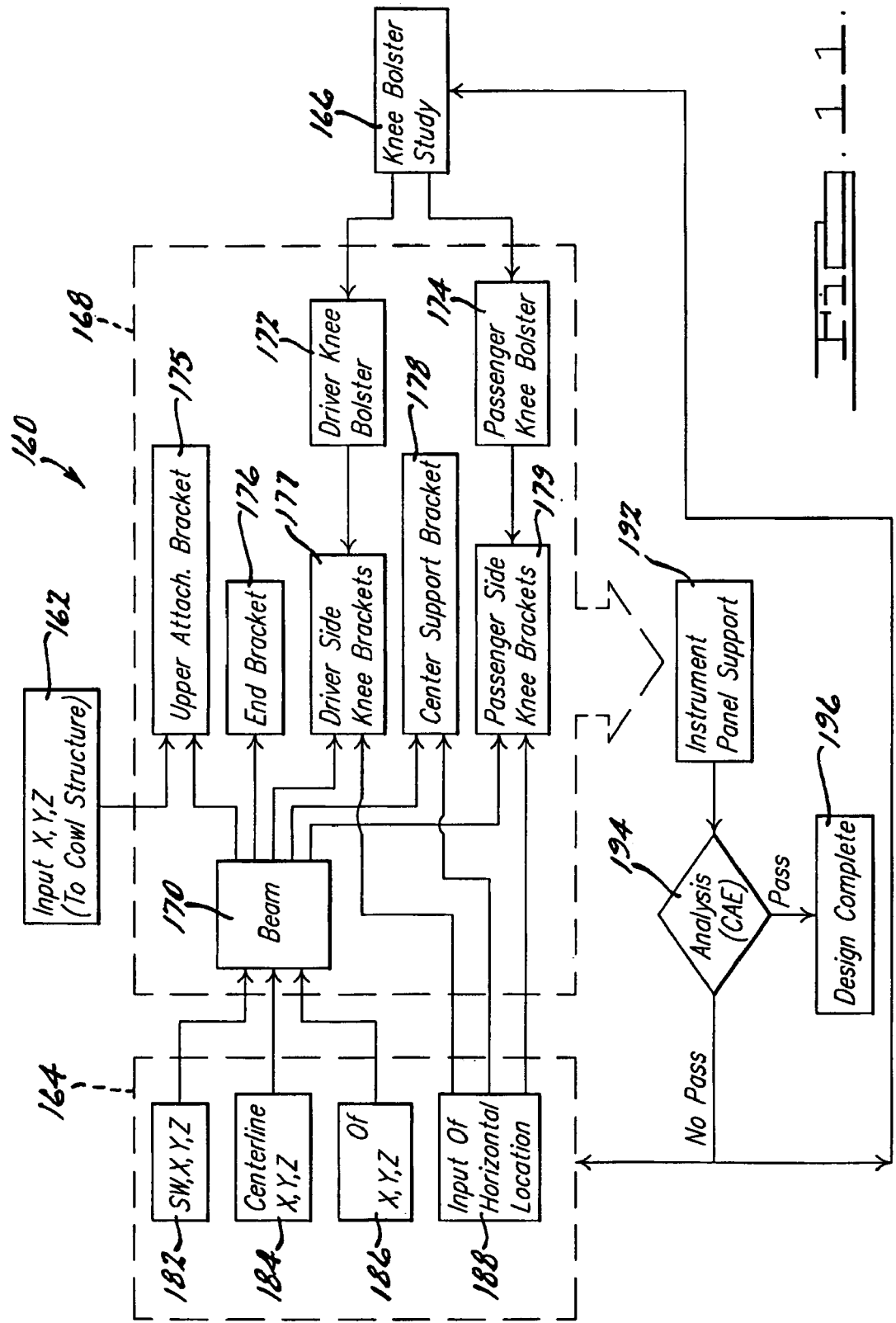
FIG. 11 is a block diagram of a method of parametric design of an instrument panel support structure for an instrument panel on a vehicle, according to the present invention, for the instrument panel support structure of FIG. 2.

Referring to FIG. 11, a block diagram of the method 18 of parametric design of an instrument panel support structure 100, according to the present invention, is illustrated graphically. In block 162, a first input parameter to block 168, to be described, represents a three-dimensional coordinate in space of an attachment location for the upper attachment bracket 114 to the cowl portion of the vehicle body, as shown at 180.

In block 164, a second input parameter to block 168 represents a three-dimensional coordinate in space defining an axis for the beam 102. In this example, four coordinate positions are used to reference the beam 102. For example, a first coordinate references the location of the steering wheel along the axis of the beam 102, as shown at 182. A second coordinate references the location of a centerline through the axis of the beam 102, shown at 184. A third coordinate references the location of the passenger side portion 106 of the axis of the beam 102, as shown at 186. A fourth coordinate represents a horizontal length for each of the portions 104, 106, and 108 of the beam 102, as shown at 188A, 188B and 188C, respectively.

In block 166, a third input parameter to block 168 is from the design tool 16. One example is a parameter derived from a knee bolster study, as is known in the art.

In block 168, the design of the instrument panel support structure 100 is parametrically derived using the inputs from blocks 162, 164, and 166. For example, the shape of the beam 102 is determined in block 170 using the location of the steering wheel 182, the centerline of the beam 184 and the location of the passenger side of the beam 186, and the horizontal locations 188A, 188B and 188C of block 164.

The shape of the beam 102 from block 170, and the attachment location to the cowl 180 from block 162 influences the shape of the upper attachment bracket 114 in block 175. The shape of the beam 102 from block 170 influences the shape of the left and right end brackets 110A 110B.

The input from the knee bolster study 166 influences the shape of the driver side knee bolster 128 and passenger side knee bolster 130 in blocks 172 and 174, respectively. The shape of the beam 102 from block 170, the horizontal driver side length 188A from block 164 and the driver side knee bolster 128 location from block 172 determine the shape of the upper driver side knee bolster attachment bracket 132 and outer and inner driver side knee bolster attachment brackets 136, 138 in block 176.

The shape of the center support bracket 150 is influenced by the beam 102 from block 170 and the horizontal center length 188B from block 164, in block 178. The shape of the beam 102 from block 170, the horizontal passenger side length 188C from block 164 and the passenger side knee bolster location from block 174, influence the shape of the upper passenger side knee bolster attachment bracket 142 and outer and inner passenger side knee bolster attachment brackets 146, 148 in block 179.

In block 192, a design of the instrument panel support structure 100 is generated. In diamond 194, the design of the instrument panel support structure 100 is analyzed to determine if a predetermined design criteria, to be described, has been met. If the predetermined design criteria have not been met, the design is regenerated by modifying the inputs in blocks 164 and 166 based upon the information learned in diamond 194. If the predetermined design criteria have been met, the design is complete, as indicated in block 196.

Figure 12:
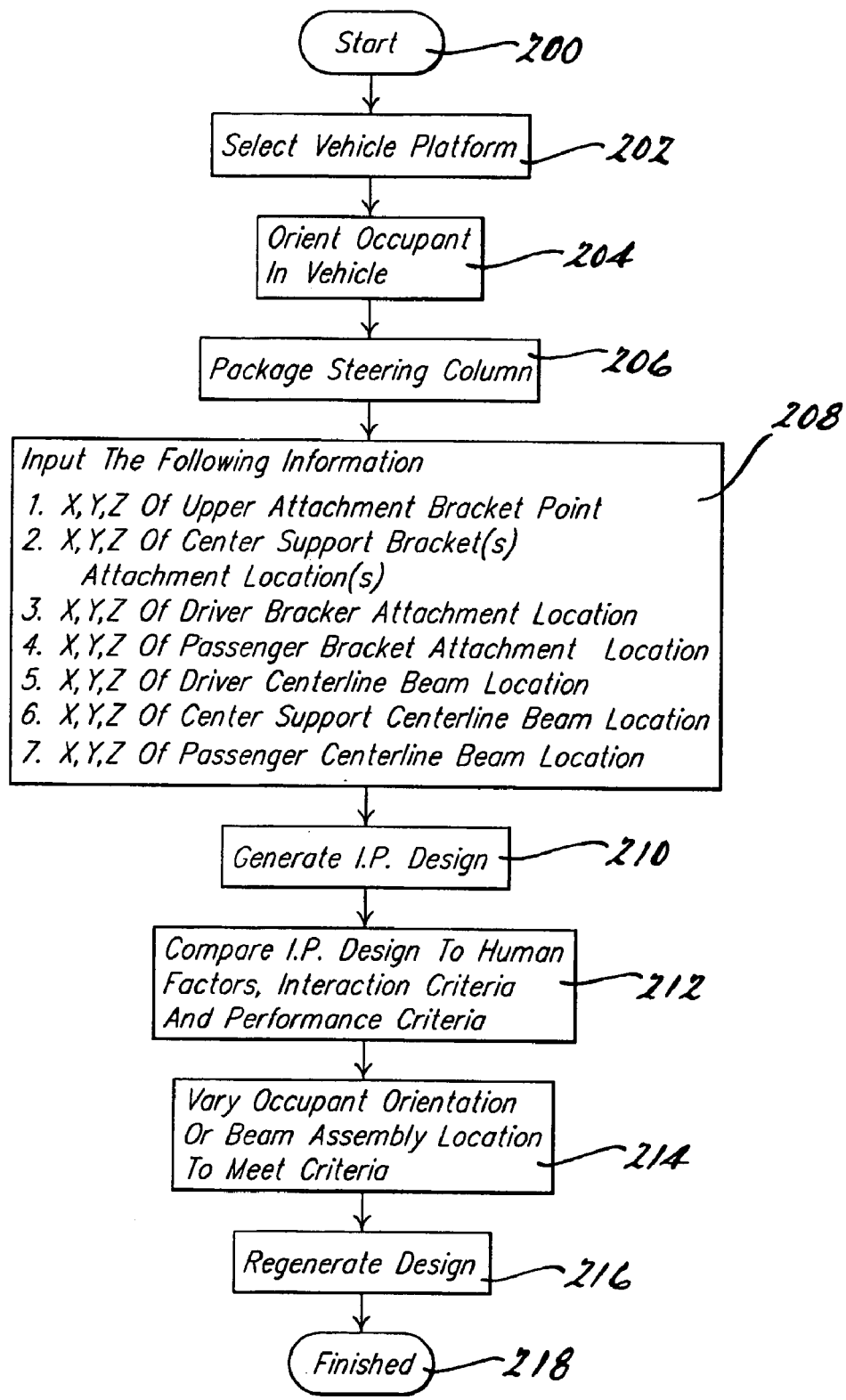
FIG. 12 is a flowchart of a method of parametric design of an instrument panel support structure for an instrument panel on a vehicle, according to the present invention, for the instrument panel support structure of FIG. 2.

Referring to FIG. 12, a flowchart of the method 18 for parametric design of the instrument panel support structure 100 using a computer-aided parametric design technique, according to the present invention, is illustrated. The methodology begins in bubble 200, when it is called for by the user 26. The methodology advances to block 202 and selects a vehicle platform from a database, such as a vehicle platform library 14. The vehicle platform library 14 contains information in electronic form regarding the vehicle environment, including interior size and vehicle body style and other vehicle systems. In this example, information regarding the vehicle body style is selected. The methodology advances to block 204.

In block 204, the methodology orients an occupant within an occupant compartment of the vehicle. In this example, the orientation of the occupant within the occupant compartment of the vehicle is in accordance with guidelines established by the Society of Automotive Engineers, in SAE J1100, "Motor Vehicle Dimensions", June 1993, which is hereby incorporated by reference. In particular, the occupant is oriented relative to a coordinate location commonly referred to in the art as an "H-point" (not shown). The "H-point" is a reference point locating the pivot center of a human torso and thigh with respect to a seat in a vehicle. The methodology advances to block 206.

In block 206, the methodology positions the steering wheel within the occupant compartment of the vehicle using dimensional guidelines established in the above referenced SAE guidelines. In this example, the steering wheel center reference point 182 is located by taking the intersection of an axis for the steering column with the plane tangent to an upper surface of the steering column rim. The methodology advances to block 208.

In block 208, the methodology defines coordinate points in space that position the instrument panel support structure 100 with respect to the vehicle body. In particular, these points define particular reference locations on the beam 102 for determining the shape and attachment of beam 102 and other components or brackets that are secured to the beam 102. One example of a coordinate point is an x,y,z coordinate of an attachment location for the upper attachment bracket 114 to the cowl, shown at 180. Another example of a coordinate point is an x,y,z coordinate of the center support bracket 150 attachment location, for attaching the center support bracket 150 to the vehicle body shown at 189. Still another example of a coordinate point is the x,y,z, coordinate of the attachment of the left and right end bracket 110A, 110B to the vehicle body, as shown at 190. Yet another example of a coordinate point is the x,y,z, coordinate of a horizontal reference for a driver side portion of the beam 102 as shown at 188A. Yet still another example of a coordinate is the x,y,z coordinate of a horizontal reference for the central portion 108 of the beam 102 shown at 188B. A further example of a coordinate is an x,y,z coordinate of a horizontal reference for the passenger side portion 106 of the beam 102 shown at 188C.

The methodology advances to block 210 and electronically generates the instrument panel support structure 100 design using the input parameters and packages the instrument support structure 100 in relation to the vehicle systems previously described. The design is generated using the design tool 16 such as a computer aided engineering design technique as is known in the art. Preferably, the appropriate relationships between the instrument panel support structure 100, vehicle body and other vehicle systems, are automatically determined and based upon the parametrically generated instrument panel support structure 100 design.

It should be appreciated that packaging refers to an electronic representation of the dimensions of the system, device or component as it geometrically relates to a three-dimensional reference frame of the vehicle. These vehicle systems may include, but are not limited to the instrument panel, the dash panel, cowl side structure, instrument panel support structure 100 and HVAC assembly. A vehicle system is intended to include any part of the vehicle which will interact with the instrument panel support structure 100, either directly or indirectly.

The methodology advances to block 212 and utilizes the design tool 16 or analysis tool 20 to determine if the instrument panel support structure 100 design meets a predetermined criteria. For example, the instrument panel support structure 100 may be compared to human factors criteria, such as for reach, ergonomics and knee bolster position. The instrument panel support structure 100 may be analyzed using engineering analytical techniques such as finite element analysis, or noise, vibration and handling (NVH) analysis.

The methodology advances to block 214 and varies an input parameter based on the results of the various analysis performed in block 212. For example, the position of the knee bolster 126 may be modified as a result of a knee bolster study.

The methodology advances to block 216 and regenerates the model of the instrument panel support structure 100 to take into account the input parameters modified in block 214. Appropriate relationships between the instrument panel support structure 100, vehicle systems and the vehicle are automatically determined and revised according to the modified input parameters. That is, the method of the present invention will automatically rebuild every other affected dimension so that various design alternatives can be evaluated in a timely manner, as shown in dot-dash lines in FIGS. 2 through 10. The methodology advances to bubble 218 and ends.

Figure 13:
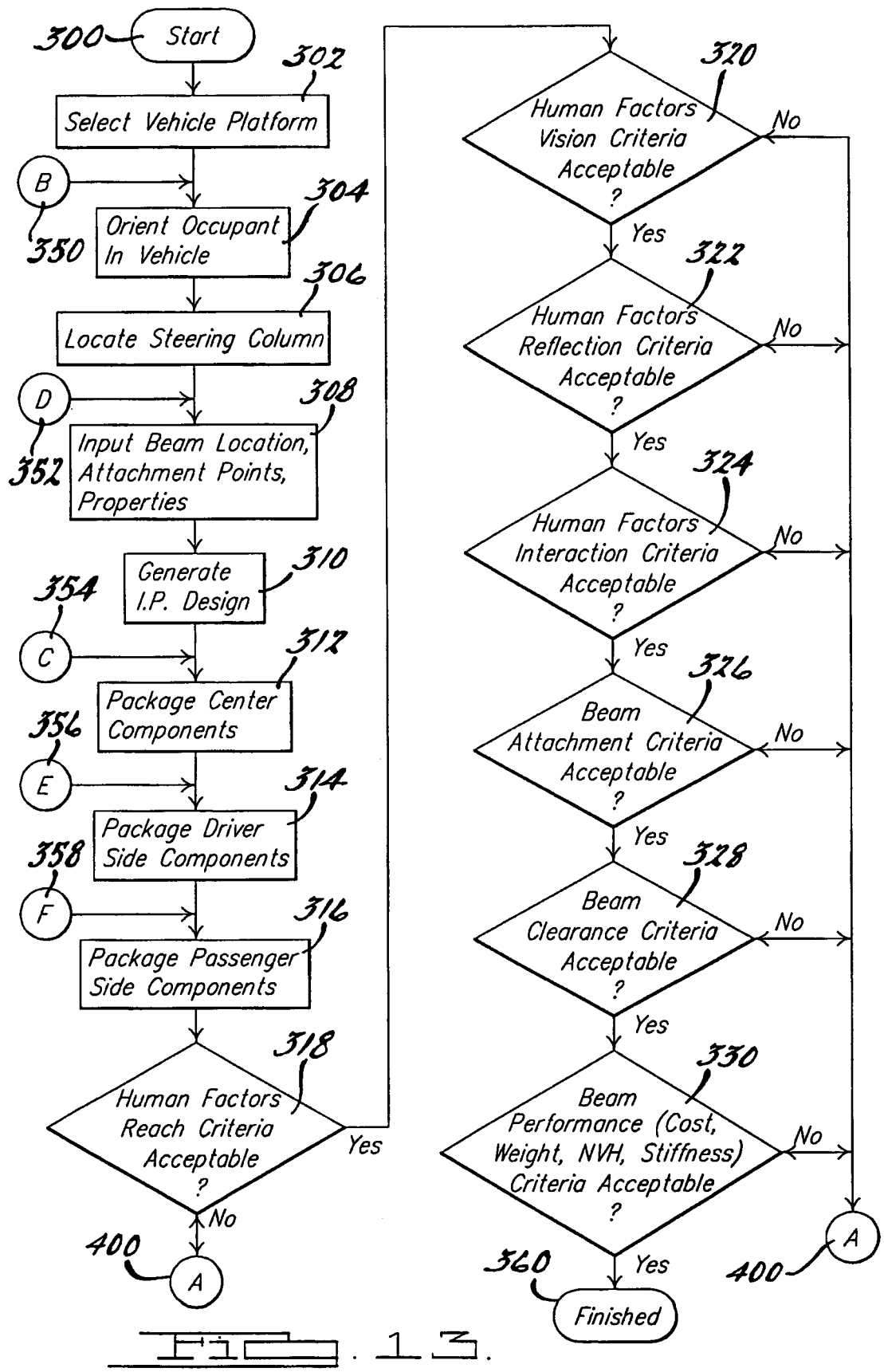
FIGS. 13 and 14 are flowcharts of another embodiment of a method of parametric design of an instrument panel support structure for an instrument panel on a vehicle, according to the present invention, for the instrument panel support structure of FIG. 2.
Figure 14:
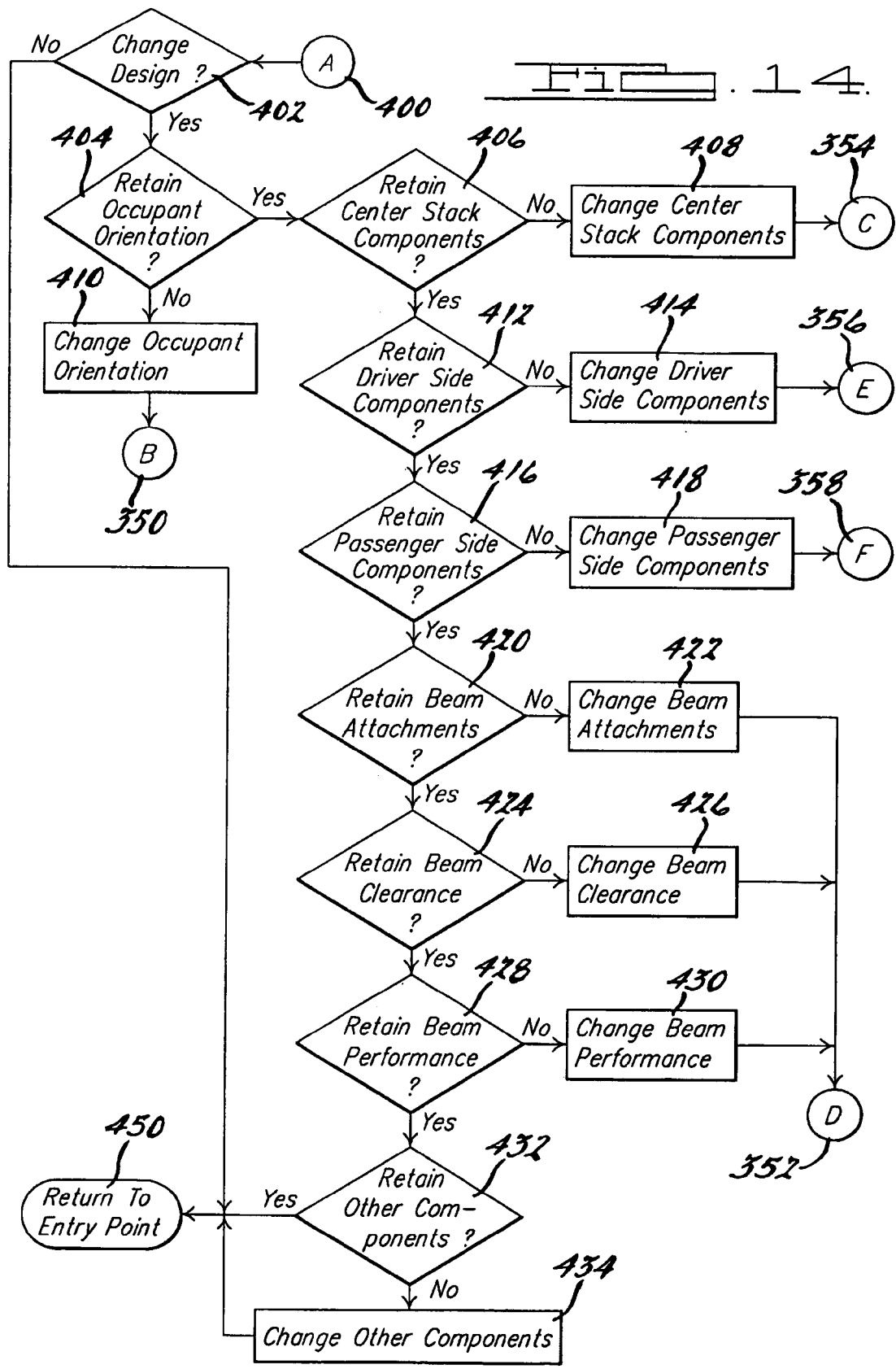

Referring to FIGS. 13 and 14, a detailed example of another embodiment of the method, according to the present invention, is shown beginning in bubble 300, when it is called for by the user 26. The methodology advances to block 302.

In block 302 the methodology selects a vehicle program from a database, such as the vehicle platform library 14. The vehicle platform library 14 contains information in electronic form regarding the vehicle environment, including interior size and vehicle body style and vehicle systems. In this example, information regarding the instrument panel and vehicle body style is selected. The methodology advances to block 304.

In block 304, the methodology orients an occupant in the vehicle using the "H-point" as a reference point, as previously described. The methodology advances to block 306 and positions the steering wheel within the vehicle utilizing the previously described dimensional reference point.

The methodology advances to block 308 and defines coordinate points that position the instrument panel support structure 100 with respect to the vehicle. For example, coordinate points as previously described locate the beam 102 with respect to the vehicle body. In this example, each end of the beam 102 is attached to the vehicle body, the top of the beam 102 is attached to the cowl via an upper attachment bracket 114, and a center support bracket 150 attaches the beam 102 to a lower portion of the vehicle body.

The methodology advances to block 310 and generates a parametric design of the instrument panel support structure 100 using a computer aided design technique, as previously described. It should be appreciated to one skilled in the art that the instrument panel support structure 100 may include other component parts as required to support the instrument panel. The methodology advances to block 312.

In block 312, the methodology packages components typically located within the center portion of the instrument panel, where they can be accessed by either a driver or a passenger. An example of a center packaged component includes an audio component, such as a compact disc player, radio or cassette player. Another example of a center packaged component includes a HVAC control or duct. The methodology advances to block 314.

In block 314, the methodology packages components (not shown) typically found on the driver side of the vehicle. Driver side components typically include an instrument panel cluster of gages and indicators, such as a speedometer, fuel gage, oil pressure gage or engine temperature gage. Another typical component is a HVAC duct for providing conditioned air to the occupant compartment of the vehicle. The methodology advances to block 316.

In block 316, the methodology packages a passenger side component (not shown), such as a glove compartment, HVAC duct or an inflatable restraint system. The methodology advances to diamond 318.

In diamond 318, the methodology uses the design tool 16 or analysis tool 20 to determine if a predetermined human factors reach criteria is met. An example of a predetermined human factors reach criteria for a driver hand control reach is set forth in a Society of Automotive Engineers Recommended Practice, "Driver Hand Control Reach", SAE J287, June 1988, which is hereby incorporated by reference. If the predetermined human factors reach criteria is not acceptable, the methodology advances to circle 400, shown in FIG. 14 and continues in a manner to be described. If the predetermined human factors reach criteria is acceptable, the methodology advances to diamond 320.

In diamond 320, the methodology uses the design tool 16 or analysis tool 20 to determine if a predetermined human factors vision criteria is acceptable. An example of a human factors vision criteria is set forth in a Society of Automotive Engineers Recommended Practice, "Describing and Measuring the Driver's Field of View", J1050, August 1994, which is hereby incorporated by reference. If the predetermined human factors vision criteria is not acceptable, the methodology advances to circle 400 shown in FIG. 14 and continues.

If the predetermined human factors vision criteria is acceptable, the methodology advances to diamond 322. In diamond 322, the methodology uses the design tool 16 or analysis tool 20 to determine if a predetermined human factors reflection criteria is acceptable for a reflective device, such as a mirror. An example of a human factors reflection criteria is set forth in a Society of Engineers Recommended Practice, "Vision Factors Consideration in Rear View Mirror Design", SAE Handbook, Vol. 4, SAE, Warrendale, Pa. If the predetermined human factors vision criteria is not acceptable, the methodology advances to circle 400 shown in FIG. 14 and continues.

If the predetermined human factors reflection criteria is acceptable, the methodology advances to diamond 324. In diamond 324, the methodology uses the design tool 16 or analysis tool 20 to determine if a predetermined human factors interaction criteria is acceptable. An example of a human factors interaction criteria includes the results of the knee bolster study. If the predetermined human factors interaction criteria is not acceptable, the methodology advances to circle 400 shown in FIG. 14 and continues. If the predetermined human factors interaction criteria is acceptable, the methodology advances to diamond 326.

In diamond 326 the methodology uses a design tool 16 or analysis tool 20 to determine if a predetermined beam attachment criteria is acceptable. An example of a beam attachment criteria is an attachment location for securing the end bracket 110A, 110B to the side structure of the vehicle body. If beam attachment criteria is not acceptable, the methodology advances to block 400 shown in FIG. 14 and continues.

If the beam attachment criteria is acceptable, the methodology advances to diamond 328. In diamond 328, the methodology uses the design tool 16 or analysis tool 20 to determine if a predetermined dimensional clearance between the instrument panel support structure 100 and another portion of the vehicle is acceptable. For example, it may be desirable that the clearance between the beam 102 and cowl be one-quarter inch (0.25"). If the instrument panel support structure clearance is not acceptable, the methodology advances to circle 400 shown in FIG. 14 and continues. If the instrument panel support structure clearance is acceptable, the methodology advances to diamond 330.

In diamond 330, the methodology uses the design tool 16 or analysis tool 20 to determine if a predetermined performance criteria for the instrument panel support structure 100 is acceptable. An example of a performance criteria is an estimated cost of the instrument panel support structure 100. Another example is that the weight of the instrument panel support structure 100 cannot exceed a predetermined amount. Still another example of a performance criteria is the NVH and stiffness characteristic of the instrument panel support structure 100. If the predetermined performance criteria are not met, the methodology advances to circle 400 shown in FIG. 14 and continues. If the predetermined performance criteria are met, the design of the instrument panel support structure 100 is complete and the methodology advances to bubble 360 and ends.

Continuing to circle 400 shown in FIG. 14, the methodology advances to diamond 402. In diamond 402, the methodology determines if the design of the instrument panel support structure 100 should be changed. If the design should not be changed, the methodology advances to bubble 450. In bubble 450 the methodology returns back to the previous entry location.

If the design does need to be changed, the methodology advances to diamond 404 and determines if an orientation of the occupant in the vehicle should be retained. As previously described, the occupant orientation refers to the "H-point" of a seated occupant. If the occupant orientation should not be changed, the methodology advances to block 410 and changes the occupant orientation. The methodology advances to circle 350 shown in FIG. 13 and continues.

Referring back to diamond 404, if the occupant orientation should be retained, the methodology advances to diamond 406. In diamond 406 the methodology determines if the center component positioned within the center support bracket 150 should be changed. If the center component should not be changed, the methodology advances to block 408. In block 408, the methodology changes the center component. The methodology advances to circle 354 shown in FIG. 13 and continues.

Referring back to diamond 406, if the center component positioned within the center support bracket 150 should be retained, the methodology advances to diamond 412. In diamond 412, the methodology determines if a driver side component should be retained. An example of a driver side component is the steering wheel or the instrument cluster, or an inflatable restraint system. If the driver side components should not be retained, the methodology advances to block 414 and changes the driver side components. The methodology then advances to circle 356 shown in FIG. 13 and continues.

Referring back to diamond 412, if the driver side component should be retained, the methodology advances to diamond 416 and determines if a passenger side component should be retained. An example of a passenger side component is a glove box, or an inflatable restraint system. If the passenger side component should not be retained, the methodology advances to block 418 and changes the passenger side component. The methodology advances to circle 358 shown in FIG. 13 and continues.

Referring back to diamond 416, if the passenger side component should be retained, the methodology advances to diamond 420. In diamond 420, the methodology determines if the instrument panel support structure attachment locations to the vehicle body should be retained. An example of an attachment location is shown at 190. If the attachment location should not be retained, the methodology advances to block 422 and changes the instrument panel support structure attachment location. The methodology then advances to circle 352 shown in FIG. 13 and continues.

Referring back to diamond 420, if the instrument panel support structure attachments should be retained, the methodology advances to diamond 424. In diamond 424, the methodology determines if a clearance between the instrument panel support structure 100 and another part of the vehicle should be retained. One example is a clearance between the beam 102 and the HVAC system. If the clearance should not be retained, the methodology advances to block 426. In block 426, the methodology changes the clearance and advances to block 352 shown in FIG. 13 and continues.

Referring back to diamond 424, if the clearance should be retained, the methodology advances to diamond 428. In diamond 428, the methodology determines if the predetermined instrument panel support structure performance criteria should be retained. One example of a predetermined criteria is optimal natural frequency. If the performance criteria should be changed, the methodology advances to block 430 and changes the instrument panel support structure performance criteria. The methodology advances to circle 352 shown in FIG. 13 and continues.

Referring back to diamond 428, if the instrument panel support structure 100 performance criteria should be retained, the methodology advances to diamond 432. In diamond 432, the methodology determines if any other component should be retained. If any other component should be retained, the methodology advances to bubble 450 previously described. If any other component should not be retained, the methodology advances to block 434 and changes the other component. The methodology then advances to bubble 450 and continues.

Referring to FIG. 15, a representative system 600 for implementing the method for parametric design of the instrument panel support structure 100, according to the present invention, is illustrated. The system 600 includes a processing unit 602 connected to a user interface which may include a display terminal 604, a keyboard 606, a pointing device, such as a mouse 608, and the like. The processing unit preferably includes a central processing unit, a memory, and stored instructions which implement the method for parametric design of the instrument panel support structure 100, according to the present invention. The stored instructions may be stored within the processing unit 602 in the memory, or in any non-volatile storage such as magnetic or optical media, EPROM, EEPROM, or the like. Alternatively, instructions may be loaded from removal magnetic media 610, such as a removal disk, sometimes called a floppy disk, optical media 612, or the like. In a preferred embodiment, the system 600 includes a general purpose computer program to implement the functions illustrated and described with reference to FIGS. 1–14. Of course, a system 600, according to the present invention, could also be embodied with a dedicated device which includes various combinations of hardware and software. The preferred embodiment may also include a printer 614 connected to the processing unit 602, as well as a network connection for accessing a local server, an intranet, and the Internet. Preferably, solid modeling software, parametric design software, surface rendering software, animation software, and the like are used for developing the system 600, according to the present invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of parametric design of an instrument panel support structure for an instrument panel in a vehicle comprising the steps of:

selecting a vehicle body style for the vehicle from a vehicle library stored in a memory of a computer system;

orienting an occupant within the vehicle body;

orienting a steering column within the vehicle body;

selecting a locating parameter for locating an instrument panel support structure within the vehicle body;

selecting an attaching parameter for attaching the instrument panel support structure within the vehicle body;

selecting a predetermined condition for the instrument panel support structure within the vehicle body;

electronically generating a parametric design of an instrument panel support structure using the locating parameter, the attaching parameter and the predetermined condition;

packaging an instrument panel component within the parametric design of the instrument panel support structure;

determining if the parametric design of the instrument panel support structure meets a predetermined criteria using a computer-aided analytical technique;

determining if the parametric design of the instrument panel support structure should be changed if the predetermined criteria is not met;

determining if a parameter should be changed if the parametric design of the instrument panel support structure should be changed;

modifying the parameter if the parameter should be changed; and using a computer-aided engineering analytical technique to determine whether the design of the instrument panel support structure meets a predetermined criteria.

2. A method of parametric design of an instrument panel support structure for an instrument panel in a vehicle comprising the steps of:

selecting a vehicle body style for the vehicle from a vehicle library stored in a memory of a computer system;

orienting an occupant within the vehicle body;

orienting a steering column within the vehicle body;

selecting a locating parameter for locating an instrument panel support structure within the vehicle body;

selecting an attaching parameter for attaching the instrument panel support structure within the vehicle body;

selecting a predetermined condition for the instrument panel support structure within the vehicle body;

electronically generating a parametric design of an instrument panel support structure using the locating parameter, the attaching parameter and the predetermined condition;

packaging an instrument panel component within the parametric design of the instrument panel support structure;

determining if the parametric design of the instrument panel support structure meets a predetermined criteria using a computer-aided analytical technique;

determining if the parametric design of the instrument panel support structure should be changed if the predetermined criteria is not met;

determining if a parameter should be changed if the parametric design of the instrument panel support structure should be changed;

modifying the parameter if the parameter should be changed; and using a computer-aided human factors analytical technique to determine whether the design of the instrument panel support structure meets a predetermined criteria.

3. A method as set forth in claims 1 or 2 wherein said step of selecting an attaching parameter includes selecting an attachment location for attaching an upper attachment bracket portion of the instrument panel support structure relative to the vehicle.

4. A method as set forth in claims 1 or 2 wherein said step of selecting an attaching parameter includes selecting an attachment location for securing a center support bracket portion of the instrument panel support structure relative to the vehicle.

5. A method as set forth in claims 1 or 2 wherein said step of selecting an attaching parameter includes selecting an attachment location for securing an outer portion of the instrument panel support structure relative to the vehicle.

6. A method as set forth in claims 1 or 2 wherein said step of selecting a locating parameter includes defining a centerline location for a center portion of the instrument panel support structure relative to the vehicle.

7. A method as set forth in claims 1 or 2 wherein said step of selecting a locating parameter includes defining a centerline location for a driver side portion of the instrument panel support structure relative to the vehicle.

8. A method as set forth in claims 1 or 2 wherein said step of selecting a locating parameter includes defining a centerline location for a passenger side portion of the instrument panel support structure relative to the vehicle.

* * * * *